United States Patent
Xiong et al.

(10) Patent No.: US 11,499,732 B2
(45) Date of Patent: Nov. 15, 2022

(54) METHOD, DEVICE AND SYSTEM FOR WIRELESS NETWORKING OF AIR CONDITIONING UNIT

(71) Applicant: Gree Electric Appliances, Inc. of Zhuhai, Guangdong (CN)

(72) Inventors: Jianguo Xiong, Guangdong (CN); Guangxu Zhang, Guangdong (CN); Jie Tang, Guangdong (CN); Weiyou Yu, Guangdong (CN); Tieying Ye, Guangdong (CN); Dongfeng Lai, Guangdong (CN); Wencan Wang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 73 days.

(21) Appl. No.: 17/046,949

(22) PCT Filed: Dec. 11, 2018

(86) PCT No.: PCT/CN2018/120375
§ 371 (c)(1),
(2) Date: Oct. 12, 2020

(87) PCT Pub. No.: WO2019/196456
PCT Pub. Date: Oct. 17, 2019

(65) Prior Publication Data
US 2021/0048209 A1     Feb. 18, 2021

(30) Foreign Application Priority Data
Apr. 13, 2018  (CN) .......................... 201810333785.2

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/58* (2018.01); *F24F 11/64* (2018.01);
(Continued)

(58) Field of Classification Search
CPC .. F24F 11/30; F24F 11/58; F24F 11/64; F24F 11/56; G05D 23/1917; H04W 4/70; H04W 8/005; H04W 76/10
See application file for complete search history.

(56) References Cited

U.S. PATENT DOCUMENTS
2006/0215650 A1   9/2006   Wollmershauser et al.

FOREIGN PATENT DOCUMENTS
CN   104613590   *   5/2013   .............. F24F 11/62
CN   103298146 A      9/2013
(Continued)

*Primary Examiner* — Jae Y Lee
(74) *Attorney, Agent, or Firm* — The Webb Law Firm

(57) ABSTRACT

The present disclosure relates to a method, device and system for air conditioning units. The method includes: acquiring information of air conditioning units; determining air conditioning units that need to be networked according to the acquired information, wherein the air conditioning units that need to be networked include a first air conditioning unit and a second air conditioning unit; sending the information of the second air conditioning unit to the first air conditioning unit, and sending the information of the first air conditioning unit to the second air conditioning unit, wherein the information of the second air conditioning unit is used for the first air conditioning unit to be networked with the second air conditioning unit, and the information of the first air conditioning unit is used for the second air conditioning unit to be networked with the first air conditioning unit.

12 Claims, 7 Drawing Sheets

(51) Int. Cl.
*F24F 11/58* (2018.01)
*G05D 23/19* (2006.01)
*H04W 8/00* (2009.01)
*H04W 4/70* (2018.01)
*H04W 76/10* (2018.01)

(52) U.S. Cl.
CPC .......... *G05D 23/1917* (2013.01); *H04W 4/70* (2018.02); *H04W 8/005* (2013.01); *H04W 76/10* (2018.02)

(56) References Cited

FOREIGN PATENT DOCUMENTS

| | | | | |
|---|---|---|---|---|
| CN | 104613588 A | 5/2015 | | |
| CN | 104613590 A | 5/2015 | | |
| CN | 104764139 A | 7/2015 | | |
| CN | 105091198 A | 11/2015 | | |
| CN | 105163301 A | 12/2015 | | |
| CN | 105526647 A | 4/2016 | | |
| CN | 107504642 A | 12/2017 | | |
| CN | 108616846 A | 10/2018 | | |
| JP | 2010048451 | * | 3/2010 | .............. F24F 11/02 |
| WO | 2017081304 A1 | | 5/2017 | |
| WO | WO 2019/196448 | * | 10/2019 | .............. F24F 11/58 |

* cited by examiner

METHOD, DEVICE AND SYSTEM FOR WIRELESS NETWORKING OF AIR CONDITIONING UNIT

CROSS-REFERENCE TO RELATED APPLICATIONS

This application is the United States national phase of International Application No. PCT/CN2018/120375 filed Dec. 11, 2018, and claims priority to Chinese Patent Application No. 201810333785.2 filed Apr. 13, 2018, the disclosures of which are hereby incorporated by reference in their entirety.

BACKGROUND OF THE INVENTION

Field of the Invention

The present disclosure relates to the field of communication, and in particular to a method, device and system for wireless networking of air conditioning units.

Description of Related Art

An air conditioning unit is an apparatus that utilizes a refrigerant and works through a compressor to generate cold water by heat exchange to be provided to a terminal air conditioning case for use. In actual use, it is often the case that different air conditioning units need to be connected by networking under different use conditions. Networking is generally classified into wired connection and wireless connection. Networking through wired connection is reliable in operation, but it is often difficult to construct due to the limitation of space. Networking through wireless connection is not limited by space, the connection is fast, and the connection range is wide, but there is a problem of low connection accuracy since it is susceptible to interference during actual use.

With the development of wireless technology, more and more air conditioning units adopt wireless communication. The inventors have found that: at the engineering installation and debugging site, there are problems, such as, it is susceptible to interference and is unstable since there are many wireless signals, and wireless signals would also be subjected to space limitation, etc., which would result in that wireless networking of air conditioners is inconvenient, the networking efficiency is low and it is prone to error, thus bringing great difficulties to engineering debugging and after-sales maintenance.

No effective solution to the above-mentioned problems has been proposed yet.

SUMMARY OF THE INVENTION

According to one aspect of the embodiments of the present disclosure, a method for wireless networking of air conditioning units is provided, comprising: acquiring information of air conditioning units; determining the air conditioning units that need to be networked according to the acquired information, wherein the air conditioning units that need to be networked comprise a first air conditioning unit and a second air conditioning unit; and sending the information of the second air conditioning unit to the first air conditioning unit, and sending the information of the first air conditioning unit to the second air conditioning unit, the information of the second air conditioning unit being used for the first air conditioning unit to be networked with the second air conditioning unit, and the information of the first air conditioning unit being used for the second air conditioning unit to be networked with the first air conditioning unit.

In some embodiments of the present disclosure, acquiring information of air conditioning units comprises: acquiring the information of the air conditioning units by means of scanning two-dimensional codes and/or bar codes of the air conditioning units.

In some embodiments of the present disclosure, determining the air conditioning units that need to be networked according to the acquired information comprises: acquiring a matching rule for matching the air conditioning units that need to be networked; and determining the air conditioning units that need to be networked according to the acquired information and the matching rule.

According to another aspect of the embodiments of the present disclosure, there is further provided a method for wireless networking of air conditioning units, comprising: receiving a networking request for requesting networking which is sent by a first air conditioning unit, wherein the networking request carries information of the first air conditioning unit; matching the received information of the first air conditioning unit with information of the first air conditioning unit pre-stored by a second air conditioning unit; and controlling the first air conditioning unit to be networked with the second air conditioning unit in the case where the matching is successful.

In some embodiments of the present disclosure, controlling the first air conditioning unit to be networked with the second air conditioning unit comprises: sending a response message for confirming networking to the first air conditioning unit, wherein the response message carries information of the second air conditioning unit, and the information of the second air conditioning unit is used for the first air conditioning unit to verify the second air conditioning unit and confirm the networking with the second air conditioning unit in the case where the verification is successful.

According to another aspect of the embodiments of the present disclosure, there is further provided a method for wireless networking of air conditioning units, comprising: sending a networking request for requesting networking to a third air conditioning unit; receiving a response message for confirming networking with the fourth air conditioning unit sent by the third air conditioning unit, wherein the response message carries information of the third air conditioning unit; matching the received information of the third air conditioning unit with the information of the third air conditioning unit pre-stored by the fourth air conditioning unit; and controlling the fourth air conditioning unit to be networked with the third air conditioning unit in the case where the matching is successful.

In some embodiments of the present disclosure, receiving a response message for confirming networking with a fourth air conditioning unit sent by the third air conditioning unit comprises: receiving the response message sent by the third air conditioning unit after confirming networking with the fourth air conditioning unit according to the information of the fourth air conditioning unit, in the case where the networking request carries information of the fourth air conditioning unit.

According to one aspect of the embodiments of the present disclosure, there is further provided a device for wireless networking of air conditioning units, comprising: an acquiring module configured to acquire information of air conditioning units; a determining module configured to determine the air conditioning units that need to be networked according to the acquired information, wherein the air conditioning units that need to be networked comprise a first air conditioning unit and a second air conditioning unit; and a communication module configured to send the information of the second air conditioning unit to the first air conditioning unit and send the information of the first air conditioning unit to the second air conditioning unit, wherein the information of the first air conditioning unit and the information of the second air conditioning unit are used for networking of the first air conditioning unit and the second air conditioning unit.

According to another aspect of the embodiments of the present disclosure, there is further provided a device for wireless networking of air conditioning units, comprising: a first receiving module configured to receive a networking request for requesting networking which is sent by a first air conditioning unit, wherein the networking request carries information of the first air conditioning unit; a first matching module configured to match the received information of the air conditioning unit with the information of the air conditioning unit pre-stored by a second air conditioning unit; and a first control module configured to control the first air conditioning unit to be networked with the second air conditioning unit in the case where the matching is successful.

According to another aspect of the embodiments of the present disclosure, there is further provided a device for wireless networking of air conditioning units, comprising: a sending module configured to send a networking request for requesting networking to a third air conditioning unit; a second receiving module configured to receive a response message for confirming networking with the fourth air conditioning unit sent by the third air conditioning unit, wherein the response message carries information of the third air conditioning unit; a second matching module configured to match the received information of the third air conditioning unit with the information of the third air conditioning unit pre-stored by the fourth air conditioning unit; and a second control module configured to control the fourth air conditioning unit to be networked with the third air conditioning unit in the case where the matching is successful.

According to one aspect of the embodiments of the present disclosure, there is further provided a system for wireless networking of air conditioning units, comprising all the above-mentioned devices for wireless networking of air conditioning units.

BRIEF DESCRIPTION OF THE DRAWINGS

The drawings illustrated here are for providing further understanding of the present disclosure and thus constitute part of the present disclosure. The exemplary embodiments of the present disclosure and descriptions thereof are for interpreting the present disclosure, not constituting improper limitations of the present disclosure. In the drawings.

DESCRIPTION OF THE INVENTION

In order to allow a person skilled in the art to better understand the solutions of the present disclosure, next a clear and complete description of the technical solutions in the embodiments of the present disclosure will be made in combination with the drawings in the embodiments of the present disclosure. Obviously, the embodiments described are only a part of rather than all of the embodiments of the present disclosure. All other embodiments obtained by a person of ordinary skill in the art based on the embodiments in the present disclosure without inventive efforts shall fall within the protection scope of the present disclosure.

It should be noted that, the terms "first", "second" and the like in the description and in the claims are used for distinguishing between similar objects and not necessarily for describing a particular sequential or chronological order. It is to be understood that the terms so used are interchangeable under appropriate circumstances, so that the embodiments of the present disclosure described herein can be implemented in other sequences than those illustrated or described herein. In addition, the terms "comprise", "comprise" and "have" and any variations thereof are intended to cover a non-exclusive inclusion, such as, processes, methods, systems, products, or devices that comprise a series of steps or units are not necessarily limited to those steps or units expressly listed, but may comprise other steps or units not expressly listed or inherent to these processes, methods, products or devices.

Embodiments of the present disclosure provide a method, device and system for wireless networking of air conditioning units, to at least solve the technical problem of low networking accuracy caused by wireless which is unstable as it is susceptible to interference.

According to embodiments of the present disclosure, embodiments of a method for wireless networking of air conditioning units are provided. It should be noted that, the steps shown in the flowcharts in the attached drawings may be executed in a computer system as a set of computer executable instructions, and while a logical order is shown in the flowcharts, the steps shown or described can, in some circumstances, be executed in a different order than the one presented herein.

Figure 1:
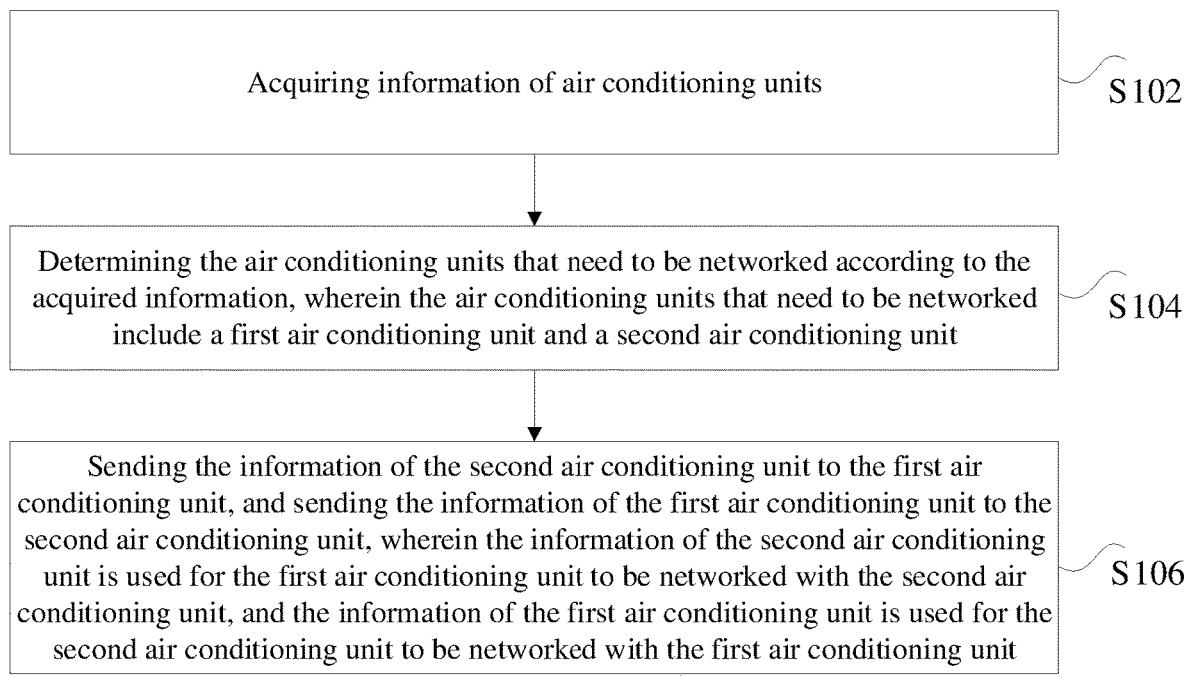
FIG. 1 is a flowchart of a method for wireless networking of air conditioning units provided in some embodiments of the present disclosure.

FIG. 1 is a flowchart of a method for wireless networking of air conditioning units provided in some embodiments of the present disclosure. As shown in FIG. 1, the method comprises Step S102 to Step S106.

In Step S102, information of air conditioning units is acquired.

In Step S104, the air conditioning units that need to be networked are determined according to the acquired information, wherein the air conditioning units that need to be networked comprise a first air conditioning unit and a second air conditioning unit;

In Step S106, the information of the second air conditioning unit is sent to the first air conditioning unit, and the information of the first air conditioning unit is sent to the second air conditioning unit, wherein the information of the second air conditioning unit is used for the first air conditioning unit to be networked with the second air conditioning unit, and the information of the first air conditioning unit is used for the second air conditioning unit to be networked with the first air conditioning unit.

Through the above-mentioned steps, after the air conditioning units that need to be networked are determined, networking information of the air conditioning units for confirming the networking is sent, the air conditioning units that need to be networked both have stored the information of the other air conditioning unit that needs to be networked, avoiding networking of an air conditioning unit not allowing networking, so that the purpose of accurate networking is achieved, the technical effect of improving the networking accuracy is thus achieved, thereby solving the technical problem of low networking accuracy caused by wireless which is unstable as it is susceptible to interference.

In some embodiments of the present disclosure, when the first air conditioning unit and the second air conditioning unit are networked, the networking may be realized in many ways, for example, in the following way: the first air conditioning unit firstly sends a networking request to the second air conditioning unit, wherein the networking request carries information of the first air conditioning unit; after receiving the networking request, the second air conditioning unit compares the received information of the first air conditioning unit with the pre-stored information of the first air conditioning unit, and if they match, sends a networking response (confirming that networking with the first air conditioning unit can be performed), wherein the networking response carries the information of the second air conditioning unit; and after receiving the networking response, the first air conditioning unit compares the received information of the second air conditioning unit with the pre-stored information of the second air conditioning unit, and if they match, confirms the networking, thus the networking of the first air conditioning unit and the second air conditioning unit is completed. The accuracy of both parties of the networking is ensured through double confirmation by the first air conditioning unit and the second air conditioning unit.

In some embodiments of the present disclosure, it should be noted that, upon acquiring information of the air conditioning units, various methods may be adopted. For example, a coordinate system may be established to obtain position coordinates of the air conditioning units, and the air conditioning units that need to be networked are determined by the position coordinates. However, position coordinates have poor precision in an actual use and a very limited application range, and the process of calculating the position coordinates is complicated.

In some embodiments of the present disclosure, upon acquiring the information of the air conditioning units, the information of the air conditioning units is acquired by means of scanning two-dimensional codes and/or bar codes of the air conditioning units. The two-dimensional code and/or bar code can not only record identification information of the air conditioning unit but also carry various available information. The information carried by the two-dimensional code and/or bar code may be some operation parameters of the air conditioning unit, specification parameters of the air conditioning unit, performance parameters of the air conditioning unit, etc. It should be noted that, the bar code may be a production bar code on an air conditioning unit. Each independent air conditioning unit has an individual production bar code during production, which is scanned directly and is easy and convenient to acquire. Two-dimensional codes are automatically generated by numbering the air conditioning units, the two-dimensional codes are in one-to-one correspondence to the air conditioning units, and the air conditioning units are determined by the two-dimensional codes. The advantage of two-dimensional codes lies in that, numbering before networking can avoid the loss of bar codes due to long service life of the air-conditioning units, which is reliable and accurate, and both two-dimensional codes and bar codes are directly scanned by a code scanner, which are convenient to acquire.

Figure 2:
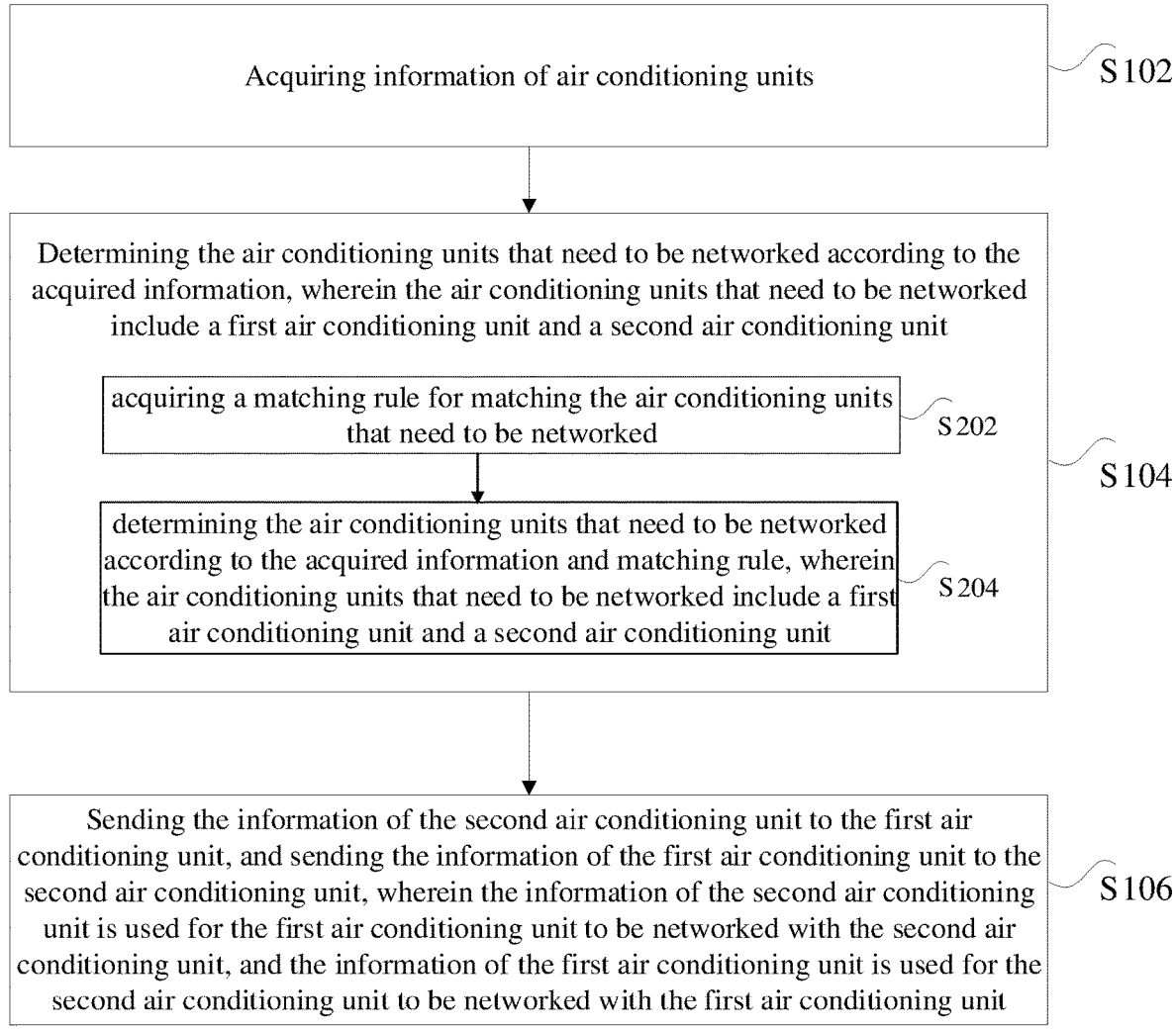
FIG. 2 is a flowchart of another method for wireless networking of air conditioning units provided in some embodiments of the present disclosure.

FIG. 2 is a flowchart of another method for wireless networking of air conditioning units provided in some embodiments of the present disclosure. As shown in FIG. 2, in the method for wireless networking of air conditioning units, determining the air conditioning units that need to be networked according to the acquired information comprises the following steps of S202 and S204.

In Step S202, a matching rule for matching the air conditioning units that need to be networked is acquired.

In Step S204, the air conditioning units that need to be networked are determined according to the acquired information and matching rule, wherein the air conditioning units that need to be networked comprise a first air conditioning unit and a second air conditioning unit.

Through the above-mentioned steps, it is possible to realize that, in the method for wireless networking of air conditioning units provided in some embodiments of the present disclosure, by determining the matching rule, the acquired information of air conditioning units is screened to determine the air conditioning units that need to be networked, thus achieving the technical effect of automatic and accurate networking through the automatic matching according to the matching rule. The steps of manual setting and selection are avoided, the labor amount of the operator is reduced, and the working efficiency can also be improved to a certain degree.

In some embodiments of the present disclosure, it should be noted that, the matching rule is determined according to actual conditions, such as, determination by pre-numbering, in which the matching relationship is determined according to the serial numbers; or determination according to the principle of proximity, in which matching objects that need to be networked are determined according to the spatial distance between the air conditioning units; or determination according to a random principle, in which a computer directly selects the networkable objects at random.

Figure 3:
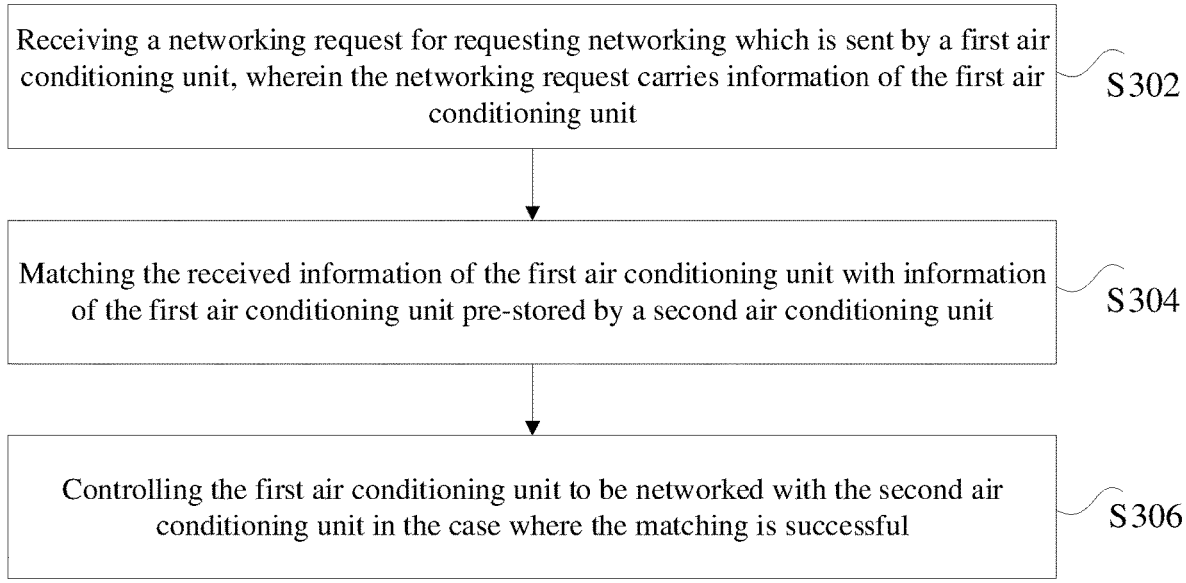
FIG. 3 is a flowchart of another method for wireless networking of air conditioning units provided in some embodiments of the present disclosure.

According to the embodiments of the present disclosure, there is further provided an embodiment of another method for wireless networking of air conditioning units. FIG. 3 is a flowchart of another method for wireless networking of air conditioning units provided in some embodiments of the present disclosure. As shown in FIG. 3, the method comprises the following steps of S302, S304 and S306.

In Step S302, a networking request for requesting networking which is sent by a first air conditioning unit is received, wherein the networking request carries information of the first air conditioning unit.

In Step S304, the received information of the first air conditioning unit is matched with information of the first air conditioning unit pre-stored by a second air conditioning unit.

In Step S306, the first air conditioning unit is controlled to be networked with the second air conditioning unit in the case where the matching is successful.

Through the above-mentioned steps, it is possible to realize that, in the method for wireless networking of air conditioning units provided in some embodiments of the present disclosure, the first air conditioning unit and the second air conditioning unit are controlled to be networked by means of matching the received information with the pre-stored information. Since the information of the air conditioning units that can be networked is pre-stored, networking with an air conditioning unit of which the information is not stored can be effectively avoided, such that the method for wireless networking of air conditioning units provided in some embodiments of the present disclosure achieves the technical effect of accurate networking, and further solves the technical problem of low networking accuracy caused by wireless which is unstable as it is susceptible to interference.

In some embodiments of the present disclosure, when the first air conditioning unit is networked with the second air conditioning unit, the networking can be performed directly after verification of the second air conditioning unit, that is, the networking is performed in a one-way verification manner. The steps are simple, and the networking is convenient, which can effectively improve the networking efficiency.

In some embodiments of the present disclosure, it is also possible to send the information of the second air conditioning unit to the first air conditioning unit and perform the networking after the verification by the first air conditioning unit. For example, in the present embodiment, controlling the first air conditioning unit to be networked with the second air conditioning unit comprises: sending a response message for confirming networking to the first air conditioning unit, wherein the response message carries information of the second air conditioning unit, and the information of the second air conditioning unit is used for the first air conditioning unit to verify the second air conditioning unit and confirm the networking with the second air conditioning unit in the case where the verification is successful. Networking in the aforementioned way of verification by both parties can effectively improve the networking accuracy, compared with the one-way verification manner.

Figure 4:
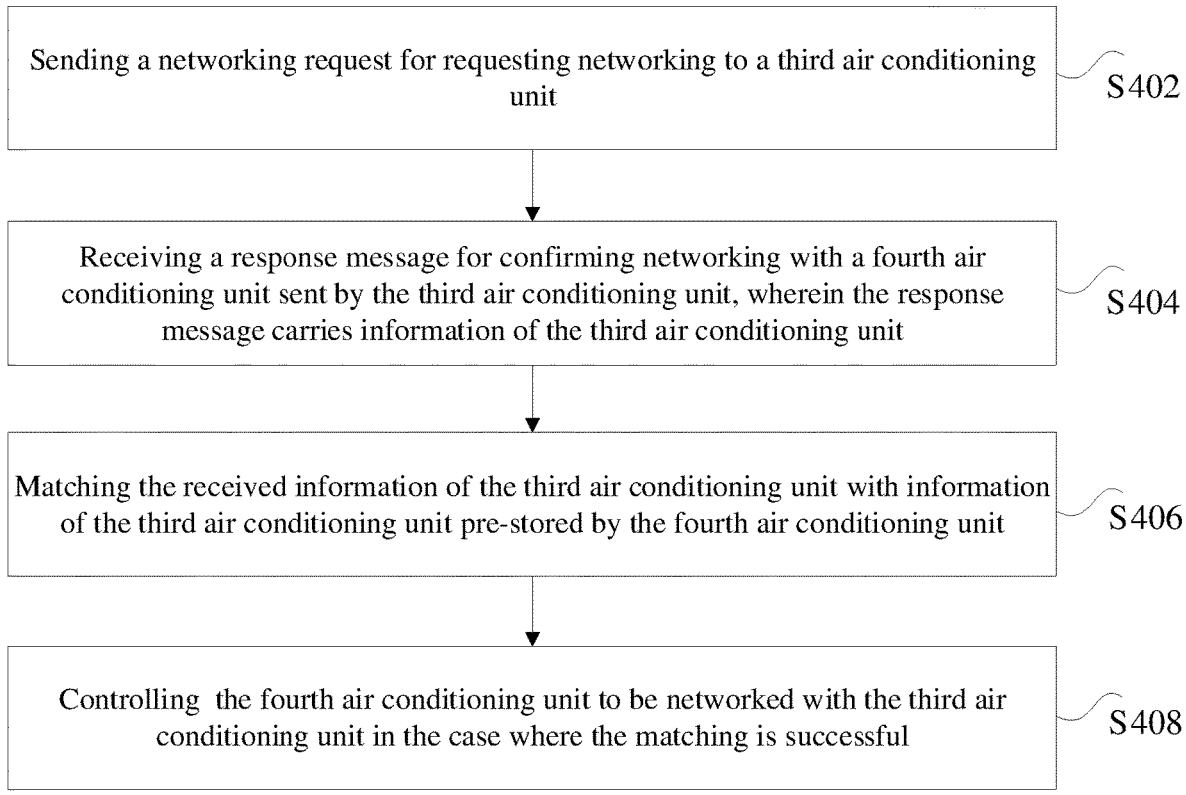
FIG. 4 is a flowchart of another method for wireless networking of air conditioning units provided in some embodiments of the present disclosure.

According to the embodiments of the present disclosure, there is further provided an embodiment of another method for wireless networking of air conditioning units. FIG. 4 is a flowchart of another method for wireless networking of air conditioning units provided in some embodiments of the present disclosure. As shown in FIG. 4, the method comprises the following steps of S402, S404, S406 and S408.

In Step S402, a networking request for requesting networking is sent to a third air conditioning unit.

In Step S404, a response message for confirming networking with a fourth air conditioning unit sent by the third air conditioning unit is received, wherein the response message carries information of the third air conditioning unit.

In Step S406, the received information of the third air conditioning unit is matched with the information of the third air conditioning unit pre-stored by the fourth air conditioning unit.

In Step S408, the fourth air conditioning unit is controlled to be networked with the third air conditioning unit in the case where the matching is successful.

Through the above-mentioned steps, the third air conditioning unit and the fourth air conditioning unit are controlled to be networked by means of matching the received information with the pre-stored information. Since the information of the air conditioning units that can be networked is pre-stored, networking with an air conditioning unit of which the information is not stored can be effectively avoided, such that the method for wireless networking of air conditioning units provided in some embodiments of the present disclosure achieves the technical effect of accurate networking, and further solves the technical problem of low networking accuracy caused by wireless which is unstable as it is susceptible to interference.

In some embodiments of the present disclosure, controlling the fourth air conditioning unit to be networked with the third air conditioning unit may be performed in the following way: the fourth air conditioning unit sends a networking request to the third air conditioning unit, receives a networking response of the third air conditioning unit and verifies the information of the third air conditioning unit, and the networking is performed if the verification is successful.

In some embodiments of the present disclosure, it should be noted that, when the fourth air conditioning unit sends a networking request to the third air conditioning unit and the third air conditioning unit receives the networking request of the fourth air conditioning unit, the confirmation of the third air conditioning unit for the networking with the fourth air conditioning unit may or may not be verified. When the networking is performed in an unverified manner, the verification process involved in the whole networking is only that the fourth air conditioning unit verifies the networking of the fourth air conditioning unit and the third air conditioning unit. In order to realize the verification involving both parties of networking in the networking process, after the third air conditioning unit verifies the information of the fourth air conditioning unit, in the case where the information matches, the third air conditioning unit sends a networking confirmation message to the fourth air conditioning unit. That is, networking verification of the networking of the third air conditioning unit and the fourth air conditioning unit by the third air conditioning unit is added. For example, the third air conditioner unit confirming networking with the fourth air conditioner unit through verification may be realized in the following way, that is, receiving a confirmation message for confirming networking with the fourth air conditioning unit sent by the third air conditioning unit may comprise: sending a networking request for requesting networking to the third air conditioning unit, wherein the networking request carries information of the fourth air conditioning unit; receiving a response message sent by the third air conditioning unit, wherein the response message is used as a confirmation message for the third air conditioning unit to confirm the networking with the fourth air conditioning unit according to the information of the fourth air conditioning unit. Realizing the networking through the process of verification by both parties effectively improves the networking accuracy.

Figure 5:
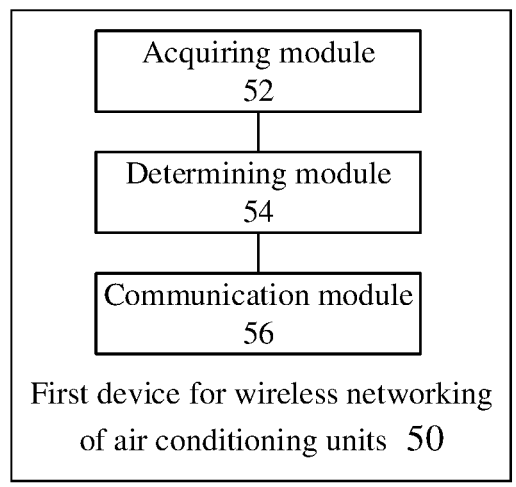
FIG. 5 is a schematic diagram of the structure of a device for wireless networking of air conditioning units provided in some embodiments of the present disclosure.

According to the embodiments of the present disclosure, there is further provided other embodiments of a device for wireless networking of air conditioning units. FIG. 5 is a schematic diagram of the structure of a first device for wireless networking of air conditioning units provided in some embodiments of the present disclosure. As shown in FIG. 5, the first device 50 for wireless networking of air conditioning units comprises an acquiring module 52, a determining module 54 and a communication module 56.

The acquiring module 52 is configured to acquire information of air conditioning units.

The determining module 54 is connected to the acquiring module 52, and is configured to determine the air conditioning units that need to be networked according to the acquired information, wherein the air conditioning units that need to be networked comprise a first air conditioning unit and a second air conditioning unit.

The communication module 56 is connected to the determining module 54, and is configured to send the information of the second air conditioning unit to the first air conditioning unit, and send the information of the first air conditioning unit to the second air conditioning unit, wherein the information of the second air conditioning unit is used for the first air conditioning unit to be networked with the second air conditioning unit, and the information of the first air conditioning unit is used for the second air conditioning unit to be networked with the first air conditioning unit.

In the embodiments of the present disclosure, after the air conditioning units that need to be networked are determined, networking information of the air conditioning units that are confirmed to be networked is sent, such that the air conditioning units that need to be networked both have stored the information of the other air conditioning unit that needs to be networked, avoiding networking of an air conditioning unit not allowing networking, so that the purpose of accurate networking is achieved, the technical effect of improving the networking accuracy is thus achieved, thereby solving the technical problem of low networking accuracy caused by wireless which is unstable as it is susceptible to interference.

Figure 6:
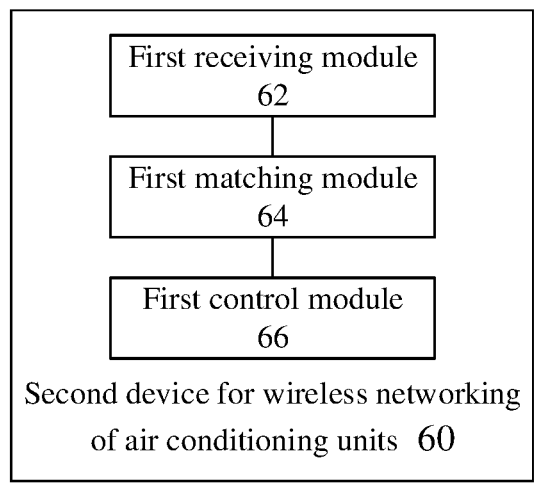
FIG. 6 is a schematic diagram of the structure of another device for wireless networking of air conditioning units provided in some embodiments of the present disclosure.

According to the embodiments of the present disclosure, there is further provided embodiments of another device for wireless networking of air conditioning units. FIG. 6 is a schematic diagram of the structure of a second device for wireless networking of air conditioning units provided in some embodiments of the present disclosure. As shown in FIG. 6, the second device 60 for wireless networking of air conditioning units comprises a first receiving module 62, a first matching module 64 and a first control module 66.

The first receiving module 62 is configured to receive a networking request for requesting networking which is sent by a first air conditioning unit, wherein the networking request carries information of the first air conditioning unit.

The first matching module 64 is connected to the first receiving module 62, and is configured to match the received information of the air conditioning unit with information of the air conditioning unit pre-stored by a second air conditioning unit.

The first control module 66 is connected to the first matching module 64, and is configured to control the first air conditioning unit to be networked with the second air conditioning unit in the case where the matching is successful.

Figure 7:
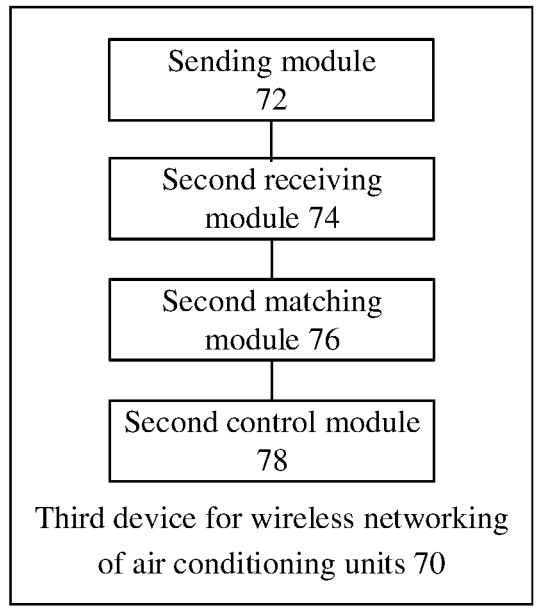
FIG. 7 is a schematic diagram of the structure of another device for wireless networking of air conditioning units provided in some embodiments of the present disclosure.

According to the embodiments of the present disclosure, there is further provided embodiments of another device for wireless networking of air conditioning units. FIG. 7 is a schematic diagram of the structure of a third device for wireless networking of air conditioning units provided in some embodiments of the present disclosure. As shown in FIG. 7, the third device 70 for wireless networking of air conditioning units comprises a sending module 72, a second receiving module 74, a second matching module 76 and a second control module 78.

The sending module 72 is configured to send a networking request for requesting networking to a third air conditioning unit.

The second receiving module 74 is configured to receive a confirmation message for confirming networking with the fourth air conditioning unit sent by the third air conditioning unit, wherein the confirmation message carries information of the third air conditioning unit.

The second matching module 76 is connected to the second receiving module 74, and is configured to match the received information of the third air conditioning unit with information of the third air conditioning unit pre-stored by the fourth air conditioning unit.

The second control module 78 is connected to the second matching module 76, and is configured to control the fourth air conditioning unit to be networked with the third air conditioning unit in the case where the information matches.

According to the embodiments of the present disclosure, there is further provided embodiments of another device for wireless networking of air conditioning units. The device for wireless networking of air conditioning units comprises a processor and a memory, wherein the memory stores instructions that, when executed by the processor, cause the device to implement the steps of the method according to the embodiments of the present disclosure.

According to the embodiments of the present disclosure, there is further provided embodiments of another device for wireless networking of air conditioning units. The device for wireless networking of air conditioning units comprises a processor and a memory, wherein the memory stores instructions that, when executed by the processor, cause the device to implement the steps of the method according to the embodiments of FIG. 1 and FIG. 2.

According to the embodiments of the present disclosure, there is further provided embodiments of another device for wireless networking of air conditioning units. The device for wireless networking of air conditioning units comprises a processor and a memory, wherein the memory stores instructions that, when executed by the processor, cause the device to implement the steps of the method according to the embodiments of FIG. 3.

According to the embodiments of the present disclosure, there is further provided embodiments of another device for wireless networking of air conditioning units. The device for wireless networking of air conditioning units comprises a processor and a memory, wherein the memory stores instructions that, when executed by the processor, cause the device to implement the steps of the method according to the embodiments of FIG. 4.

Figure 8:
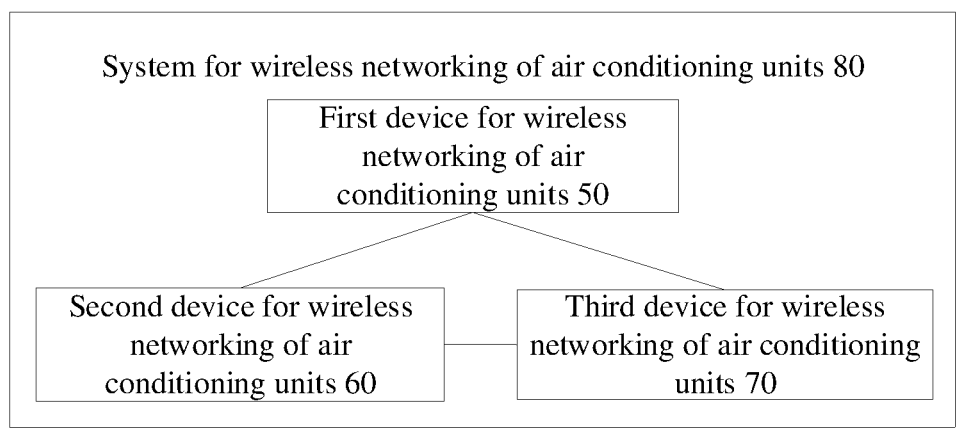
FIG. 8 is a schematic diagram of the structure of a system for wireless networking of air conditioning units provided in some embodiments of the present disclosure.

According to the embodiments of the present disclosure, there is further provided other embodiments of a system for wireless networking of air conditioning units. FIG. 8 is a schematic diagram of the structure of a system for wireless networking of air conditioning units provided in some embodiments of the present disclosure. As shown in FIG. 8, the system 80 for wireless networking of air conditioning units comprises: a first device 50 for wireless networking of air conditioning units, a second device 60 for wireless networking of air conditioning units and a third device 70 for wireless networking of air conditioning units, wherein the first device 50 for wireless networking of air conditioning units, the second device 60 for wireless networking of air conditioning units and the third device 70 for wireless networking of air conditioning units are connected with each other and are in communication with each other in a wired or wireless manner.

It should be noted that, the networking of the first air conditioning unit and the second air conditioning unit, and the networking of the third air conditioning unit and the fourth air conditioning unit may be networking of various types of air conditioning units, for example, the networking may be networking of internal and external units of a multi-split air conditioner. Some embodiments of the present disclosure are described below with the networking of internal and external units of a multi-split air conditioner as an example.

In some embodiments of the present disclosure, when internal and external units of a multi-split air conditioner adopt a wireless communication mode, at the engineering installation and debugging site, during the engineering debugging of the multi-split air conditioner, the distance between the units is far, there are many wireless signals, and other wireless devices exist at the engineering site, and there is no human-machine operation interface similar to a touch screen or other interactive equipment in the internal and external units of the multi-split air conditioner. resulting in a shortage of networking matching methods, various steps, thus making effective identification impossible. Therefore, the wireless networking of the internal and external units of the air conditioner is inconvenient, the networking efficiency is low, and it is prone to error, which brings great difficulties to the engineering debugging and after-sales maintenance of the multi-split air conditioner. Thus, in some embodiments of the present disclosure, a method for wireless networking of the internal and external units of a multi-split air conditioner is provided.

In some embodiments of the present disclosure, a networking device is provided. By utilizing the bar codes of the internal and external units of the multi-split air conditioner, the bar codes of the internal and external units which need to be networked at an engineering site are acquired by a code scanner, and the information of the internal and external units contained in the bar codes is analyzed to select the internal and external units which need to be networked, and the bar code information of the internal units is sent to the external unit which needs to be networked therewith. The external unit stores the bar code information of the internal units which need to be networked with the external unit (for example, it may be a list of internal units that need to be networked with external unit), and the external unit filters out wireless data irrelevant to the stored information of the internal units; meanwhile, the bar code information of the external unit is sent to the internal units which need to be networked therewith, and the internal units will filter out wireless data irrelevant to the stored information of the external unit. When the networking is subjected to engineering debugging, after the external unit receives a networking request of an internal unit at the engineering site, only the internal units, of which the information have been prestored, can be networked with the external unit; meanwhile, the internal units will also verify whether the external unit to be networked therewith is consistent with the one stored therein, thus ensuring the accuracy of the networking information of the internal and external units, improving the networking efficiency and ensuring the networking correctness. By performing the networking of internal and external units of an air conditioner in the above-mentioned way, the problems of difficulty in networking and difficulty in maintenance, due to the long distance between the internal and external units, many wireless devices and lack of a human-machine interactive interface on the internal and external units at the site, in the installation and debugging phase and the subsequent maintenance phase of a wireless multi-split air conditioner, are solved. By means of the networking device, it is possible to realize quick networking of internal and external units of a multi-split air conditioner and ensure the correctness of the networking of internal and external units.

Figure 9:
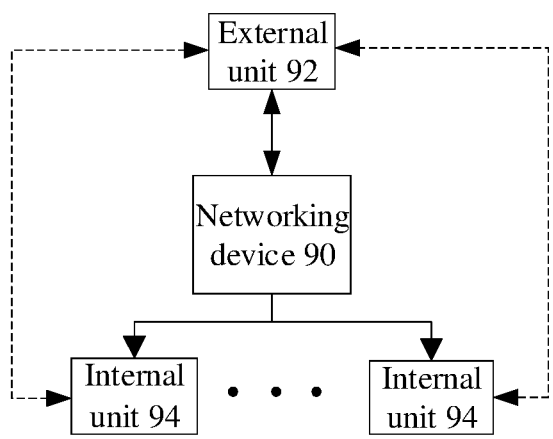
FIG. 9 is a schematic diagram of the structure of a networking system provided in some embodiments of the present disclosure.

FIG. 9 is a schematic diagram of the structure of a networking system provided in some embodiments of the present disclosure. As shown in FIG. 9, the above-mentioned networking device 90 is in wired connection and communication with internal and external units, respectively. Wired connection transmission is reliable, and it is subjected to little interference of external signals, which can ensure effective communication between the networking device and the internal and external units. The internal and external units are in wireless connection. Wireless connection is not limited by space, it can be performed anytime and anywhere, its application range is wide, and the connection speed is high. It should be noted that, the communication between the networking device and the internal and external units may also be reliable wireless communication, and the communication between the external unit 92 and the internal units 94 may also be wired communication, which can be flexibly selected, with no specific communication method being defined.

Figure 10:
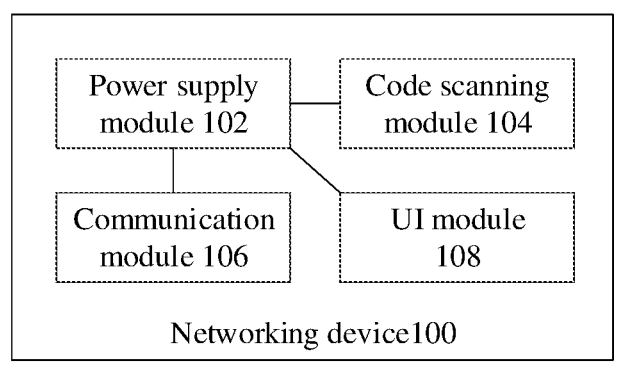
FIG. 10 is a schematic diagram of the structure of a networking device provided in some embodiments of the present disclosure.

FIG. 10 is a schematic diagram of the structure of a networking device provided in some embodiments of the present disclosure. As shown in FIG. 10, the networking device 100 comprises: a power supply module 102 configured to provide a power source for the operation of the device, comprising operation of a controller, liquid crystal backlight, etc.; a code scanning module 104 configured to acquire bar codes of the internal and external units, wherein the bar codes are unique, and model information can be acquired through the bar codes; a communication module 106 configured to realize the communication between the networking device and the internal and external units; a User Interface (simply referred to as UI) module 108 mainly configured to provide an interactive interface for an operator, comprising a capacitive touch screen, a color liquid crystal display, a buzzer, etc., and configured to dynamically display information of the internal and external units obtained by code scanning, data of communication between the internal and external units, networking state, etc.

Figure 11:
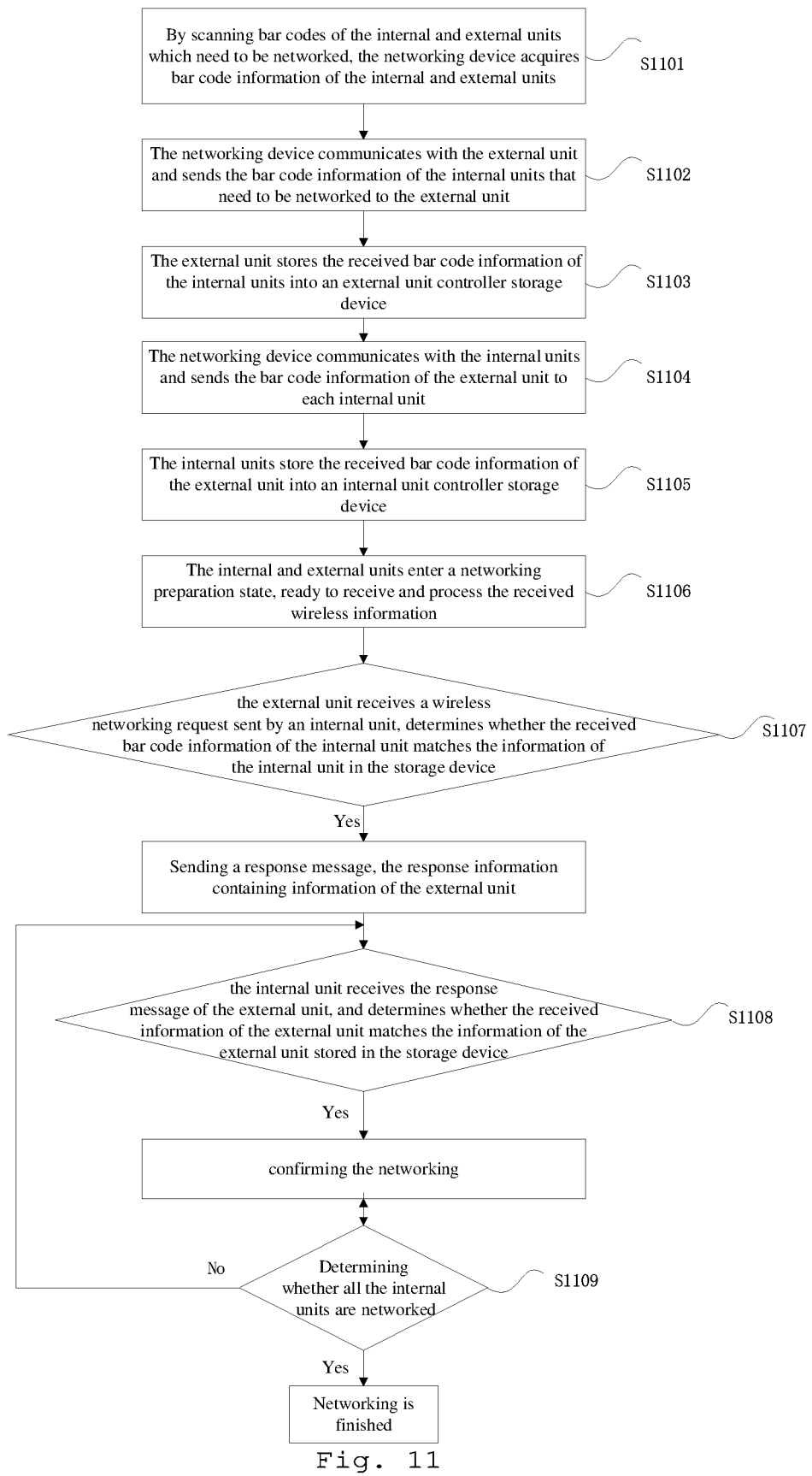
FIG. 11 is a flowchart of a networking method provided in some embodiments of the present disclosure.

FIG. 11 is a flowchart of a networking method provided in some embodiments of the present disclosure. As shown in FIG. 11, the method for networking of internal and external units comprises the following steps:

Step S1101, by scanning bar codes of the internal and external units which need to be networked, the networking device acquires bar code information of the internal and external units.

Step S1102, the networking device communicates with the external unit and sends the bar code information of the internal units that need to be networked to the external unit.

Step S1103, the external unit stores the received bar code information of the internal units into an external unit controller storage device.

Step S1104, the networking device communicates with the internal units and sends the bar code information of the external unit to each internal unit.

Step S1105, the internal units store the received bar code information of the external unit into an internal unit controller storage device.

Step S1106, the internal and external units enter a networking preparation state, ready to receive and process the received wireless information.

Step S1107, the external unit receives a wireless networking request sent by an internal unit, determines whether the received bar code information of the internal unit matches the information of the internal unit in the storage device, and if so, makes a response, the response information containing the information of the external unit.

Step S1108, the internal unit receives the response message of the external unit, and determines whether the received information of the external unit matches the information of the external unit stored in the storage device, and if so, confirms the networking.

Step S1109, the step S1108 is repeated in sequence until the networking of all the internal and external units that need to be networked is completed.

With the help of the networking device, the program debugging personnel can conveniently and quickly perform the networking operation on the internal and external units that need to be networked when performing wireless networking in the engineering debugging phase, ensuring that only the internal and external units that meet the requirement are networked and avoiding the networking interference of other adjacent, irrelevant equipment and loss of internal unit networking.

The networking device can complete wireless networking with high efficiency and high reliability in the engineering debugging phase and after-sales maintenance phase of a wireless multi-split air conditioner. It accelerates the engineering debugging progress, and improves the after-sales maintenance efficiency and user satisfaction degree.

In some embodiments of the present disclosure, it should be noted that, while the networking device scans codes to obtain the bar code information of the internal and external units, a white list may be established respectively for the internal and external units. The white list contains bar code information that can be networked with the internal unit or the external unit, which greatly reduces the number of comparison in networking, effectively improves the networking efficiency, increases the networking accuracy and makes the networking more reliable.

The serial numbers of the above-mentioned embodiments of the present disclosure are only for the purpose of description, and do not represent the quality of the embodiments.

In the above-mentioned embodiments of the present disclosure, the description of each embodiment has its own emphasis, and for a part that is not described in detail in a certain embodiment, reference may be made to related description of other embodiments.

In the several embodiments provided by the present disclosure, it should be understood that the disclosed technical content may be implemented in other ways. The above-described device embodiments are merely illustrative, for example, the division of units may be a logical division, and there may be another way of division in actual implementation, such as, multiple units or components may be combined or may be integrated into another system, or some features may be omitted, or may not be executed. In addition, the coupling, direct coupling or communication connection illustrated or discussed herein may be implemented through indirect coupling or communication connection between interfaces, units or modules, which may be in an electronic form, a mechanical form, or other forms.

The units described as separate parts may or may not be physically separate, and parts shown as a unit may or may not be a physical unit, e.g., they may be located in one position, or may be distributed on several units. Part of or all of the units may be selected according to the actual requirement to achieve the objectives of the solutions of the embodiments of the present disclosure.

In addition, functional units in various embodiments of the present disclosure may be integrated in one processing unit, or each unit may exist separately physically, or two or more units may be integrated in one unit. The integrated unit may be implemented in the form of hardware, or may also be implemented in the form of a software functional unit.

If the integrated unit is implemented in the form of a software functional unit and functions as an independent product for sale or use, it may be stored in a computer readable storage medium. Based on such understanding, the technical solutions of the present disclosure in essence, or apart of the technical solutions that makes contribution to the prior art, or all or part of the technical solutions may be embodied in the form of a software product. The computer software product is stored in a storage medium, comprising a number of instructions that enable a computer device (which may be a PC, a server, or a network device, etc.) to execute all or part of the steps of the methods provided in various embodiments of the present disclosure. The aforementioned storage medium comprises various media capable of storing program codes, such as, a read only memory (ROM), a random access memory (RAM), a mobile hard disk, a magnetic disk, or an optical disk.

The above embodiments are merely preferred embodiments of the present disclosure. It should be set forth that, for a person skilled in the art, on the premise of not departing away from the principles of the present disclosure, improvements and modifications may also be made, and such improvements and modifications are also deemed to be within the protection scope of the present disclosure.

What is claimed is:

1. A method for wireless networking of air conditioning units, comprising:

acquiring information of the air conditioning units;

determining air conditioning units that need to be networked according to the acquired information, wherein the air conditioning units that need to be networked comprise a first air conditioning unit and a second air conditioning unit; and sending information of the second air conditioning unit to the first air conditioning unit, and sending information of the first air conditioning unit to the second air conditioning unit, wherein the information of the second air conditioning unit is used for the first air conditioning unit to be networked with the second air conditioning unit, the information of the first air conditioning unit is used for the second air conditioning unit to be networked with the first air conditioning units, the first air conditioning unit sends a networking request to the second air conditioning unit, wherein the networking request carries information of the first air conditioning unit, after receiving the networking request, the second air conditioning unit matches the received information of the first air conditioning unit with the pre-stored information of the first air conditioning unit, the second air conditioning unit sends a networking response to the first air conditioning unit in the case where the matching is successful, wherein the networking response carries the information of the second air conditioning unit, after receiving the networking response, the first air conditioning unit verifies the received information of the second air conditioning unit with the pre-stored information of the second air conditioning unit, and the first air conditioning unit confirms the networking with the second air conditioning unit in the case where the verification is successful, the first air conditioning unit is an internal unit, and the second air conditioning unit is an external unit.

2. The method according to claim 1, wherein acquiring the information of the air conditioning units comprises:
acquiring the information of the air conditioning units by means of scanning two-dimensional codes and bar codes of the air conditioning units.

3. The method according to claim 1, wherein determining the air conditioning units that need to be networked according to the acquired information comprises:
acquiring a matching rule for matching the air conditioning units that need to be networked; and
determining the air conditioning units that need to be networked according to the acquired information and the matching rule.

4. A device for wireless networking of air conditioning units, comprising:
a processor; and
a memory storing instructions that, when executed by the processor, cause the device to implement the steps of the method according to claim 1.

5. A system for wireless networking of air conditioning units, comprising: the device for wireless networking of air conditioning units according to claim 4.

6. The method according to claim 1, wherein acquiring the information of the air conditioning units comprises:
acquiring the information of the air conditioning units by means of scanning two-dimensional codes or bar codes of the air conditioning units.

7. A method for wireless networking of air conditioning units, comprising:
receiving a networking request for requesting networking which is sent by a first air conditioning unit, wherein the networking request carries information of the first air conditioning unit;
matching the received information of the first air conditioning unit with information of the first air conditioning unit pre-stored by a second air conditioning unit; and
send a networking response to the first air conditioning unit in the case where the matching is successful, wherein the networking response carries the information of the second air conditioning unit, after receiving the networking response, the first air conditioning unit verifies the received information of the second air conditioning unit with the pre-stored information of the second air conditioning unit, the first air conditioning unit confirms the networking with the second air conditioning unit in the case where the verification is successful, the first air conditioning unit is an internal unit, and the second air conditioning unit is an external unit.

8. A device for wireless networking of air conditioning units, comprising:
a processor; and
a memory storing instructions that, when executed by the processor, cause the device to implement the steps of the method according to claim 7.

9. A system for wireless networking of air conditioning units, comprising: the device for wireless networking of air conditioning units according to claim 8.

10. A method for wireless networking of air conditioning units, comprising:
sending a networking request for requesting networking to a second air conditioning unit, wherein networking request carries information of the air conditioning unit, after receiving the networking request, the second air conditioning unit matches the received information of the first air conditioning unit with the pre-stored information of the first air conditioning unit, and the second air conditioning unit sends a networking response to the first air conditioning unit in the case where the matching is successful;
receiving the networking response for confirming networking with the first air conditioning unit sent by the second air conditioning unit, wherein the response message carries information of the second air conditioning unit;
matching the received information of the second air conditioning unit with information of the second air conditioning unit pre-stored by the first air conditioning unit; and
controlling the first air conditioning unit to be networked with the second air conditioning unit in the case where the matching is successful, wherein the first air conditioning unit is an internal unit, and the second air conditioning unit is an external unit.

11. A device for wireless networking of air conditioning units, comprising:
a processor; and
a memory storing instructions that, when executed by the processor, cause the device to implement the steps of the method according to claim 10.

12. A system for wireless networking of air conditioning units, comprising: the device for wireless networking of air conditioning units according to claim 11.

* * * * *